Fig. I.

July 13, 1965  J. P. KUNKLE  3,194,576
FOLDABLE CARRIER DEVICE
Filed April 27, 1962  5 Sheets-Sheet 2

INVENTOR.
J. PAUL KUNKLE
BY
his ATTORNEY

July 13, 1965   J. P. KUNKLE   3,194,576
FOLDABLE CARRIER DEVICE
Filed April 27, 1962                                5 Sheets-Sheet 3

INVENTOR.
J. PAUL KUNKLE
BY
his ATTORNEY

July 13, 1965   J. P. KUNKLE   3,194,576
FOLDABLE CARRIER DEVICE
Filed April 27, 1962   5 Sheets-Sheet 4
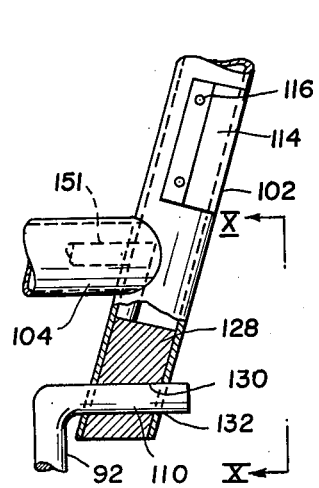
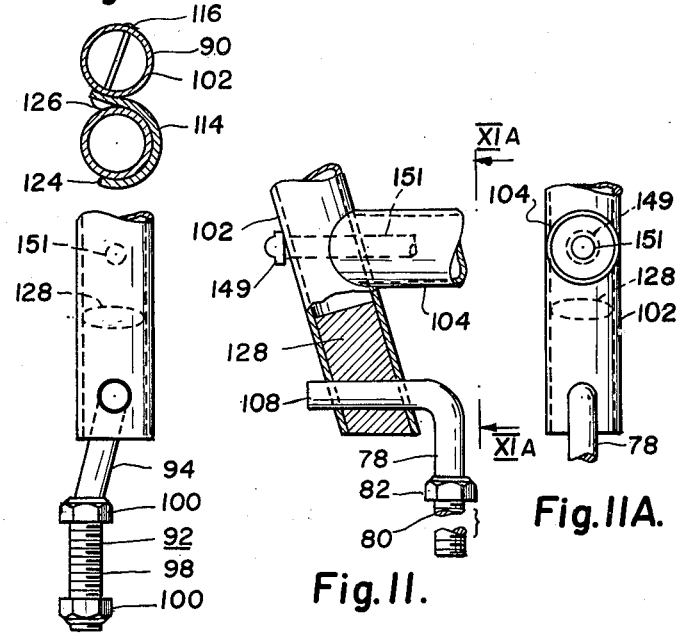
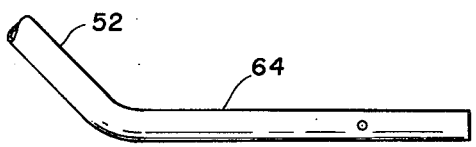
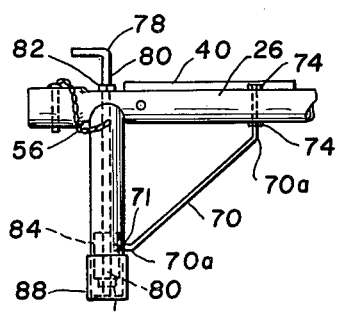
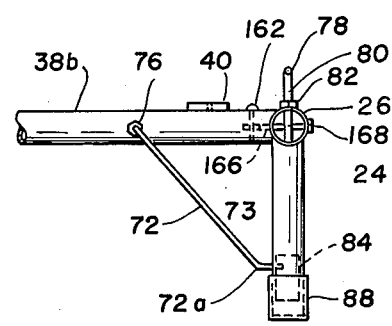
INVENTOR.
J. PAUL KUNKLE
BY
his ATTORNEY July 13, 1965   J. P. KUNKLE   3,194,576
FOLDABLE CARRIER DEVICE Filed April 27, 1962   5 Sheets-Sheet 5

INVENTOR.
J. PAUL KUNKLE
BY
his ATTORNEY

United States Patent Office 3,194,576
Patented July 13, 1965

3,194,576
FOLDABLE CARRIER DEVICE
Joseph Paul Kunkle, R.D. 1, Irwin, Pa.
Filed Apr. 27, 1962, Ser. No. 191,404
8 Claims. (Cl. 280—36)

The present invention relates to a foldable hand cart suitable for a plurality of utilitarian purposes, and more particularly to a relatively simple, rugged, foldable or collapsible utility cart which can be readily placed in the folded or unfolded condition thereof.

This invention provided a carrier device or hand cart light of weight but sufficiently strong to carry substantial and even bulk loads, and arranged so as to permit facile reduction of size for transport to and from points of utilization. In one arrangement of the invention the collapsible cart is readily foldable to a size such that the cart can be placed in the trunk of an automobile for storage or for transportation to such points of use, involved, for example, in family outings and similar activities. It is also contemplated that the cart be so sized as to be capable of being placed in a loaded but semicollapsed condition in the trunk of an automobile for such purposes.

While foldable carts have long been known in the art, previous carts frequently suffered from the disadvantages of being cumbersome in shape or size when folded, adapted only for transporting loads of particular size and shape, requiring a large number of component parts for their construction and operation, requiring complicated clamps or other fastening devices for which hand or other tools were needed for their operations, or being difficult for an individual to operate comfortably in the operative condition thereof.

In view of the foregoing, an object of the present invention is the provision of a novel and efficient form of collapsible cart.

Another object of the invention is the provision of a collapsible utility cart, which is light in construction but which is capable of carrying relatively heavy or bulky loads.

A further object of the invention is the provision of a foldable carrier device which, in its collapsed condition, is compact in size and construction for ready transport to and from points of utilization.

Still another object of the invention is the provision of a collapsible cart requiring relatively few component parts. More specifically it is an object of the invention to provide a cart of the character described which can be manipulated between its collapsed and operating conditions without the use of hand tools or other special tools.

Yet another object of the invention is the provision of a foldable cart adapted for carrying relatively heavy loads and shaped for use in its operation condition such that an operator thereof need not assume an unnatural stance.

A further object of the invention is the provision of a carrier device of the class described, which can be placed fully loaded, in a semicollapsed condition, into the trunk of an automobile for transportation to points of utilization.

These and other objects, features, and advantages of the invention will be made apparent during the forthcoming description of an illustrative modification thereof, with the description being taken in conjunction with the accompanying drawings wherein:

FIGURE 8 is an enlarged, cross-sectional view of the clamping means associated with the front and side wall members of the cart and taken along reference line VIII—VIII of FIG. 2, with parts being omitted for clarity;

FIGURE 9 is an enlarged detailed view, partially in section, of the bearing and bracket assembly associated with the front end of each side wall of the collapsible cart;

FIGURE 10 is a front elevational view of the detailed showing of FIG. 9 and taken along reference line X—X thereof;

FIGURE 11 is a detailed view showing the rear side wall bracket assembly;

FIGURE 11A is a partial front elevational view of the detailed showing of FIG. 11 and taken along reference line XIA—XIA thereof;

FIGURE 12 is an enlarged, detailed, side elevational view, partially exploded, of the supporting leg of the cart as depicted in FIG. 2;

FIGURE 13 is a partial end elevational view of the supporting leg of FIG. 12.

In accordance with the invention, a collapsible utility cart is furnished in one modification thereof in the form of a two wheeled hand cart provided with a generally horizontal framework having a pair of wheels at one end and a pair of stationary supports at the other end. A bifurcate or generally U-shaped handle is detachably joined to the framework and is shaped so that an operator can manipulate the cart without assuming an unnatural position or stance. In this example of the invention a pair of foldable or collapsible side walls and an end wall are secured to the platform. To maintain the side and end walls in a generally upright position a friction-clamp is secured to one of each pair of apposing ends of the wall members at each corner formed thereby when the wall members are in their upright or operative positions. Accordingly, in order to maintain the wall members in their erect positions the other apposing end is snapped into place in the friction-clamp. In one application of the invention, one of the aforementioned friction clamps is secured to the front end of each of the side wall members and both of the last mentioned friction-clamps are arranged for substantially simultaneous engagement with the adjacent ends respectively of the end wall member as the latter is moved to its upright, operative position.

In other aspects of the invention certain of the hinge members associated with the collapsible walls of the cart are further arranged for securing other component parts of the cart to the aforementioned platform, such as the stationary supports secured to the platform at positions spaced from the aforementioned wheels.

Figure 1:
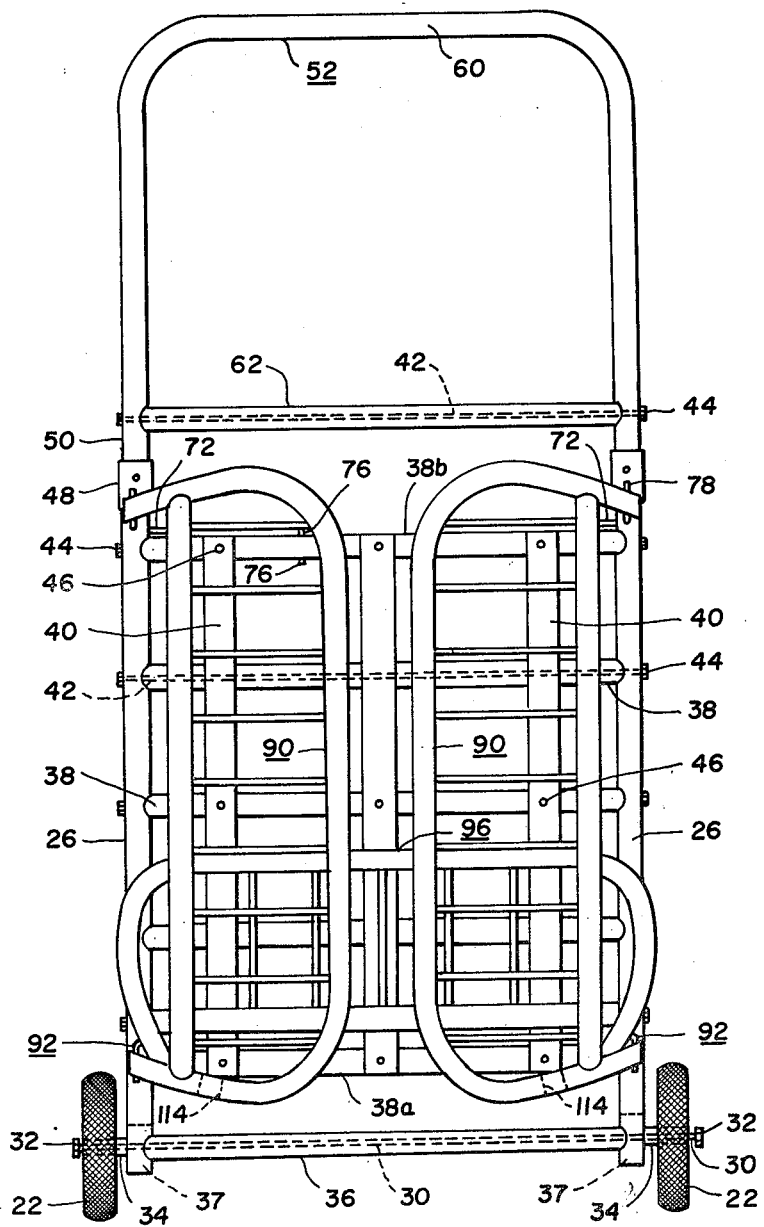
FIGURE 1 is a top plan view of one form of collapsible cart arranged in accordnace with the invention and showing the collapsed positions of the side and end walls of the cart.
Figure 2:
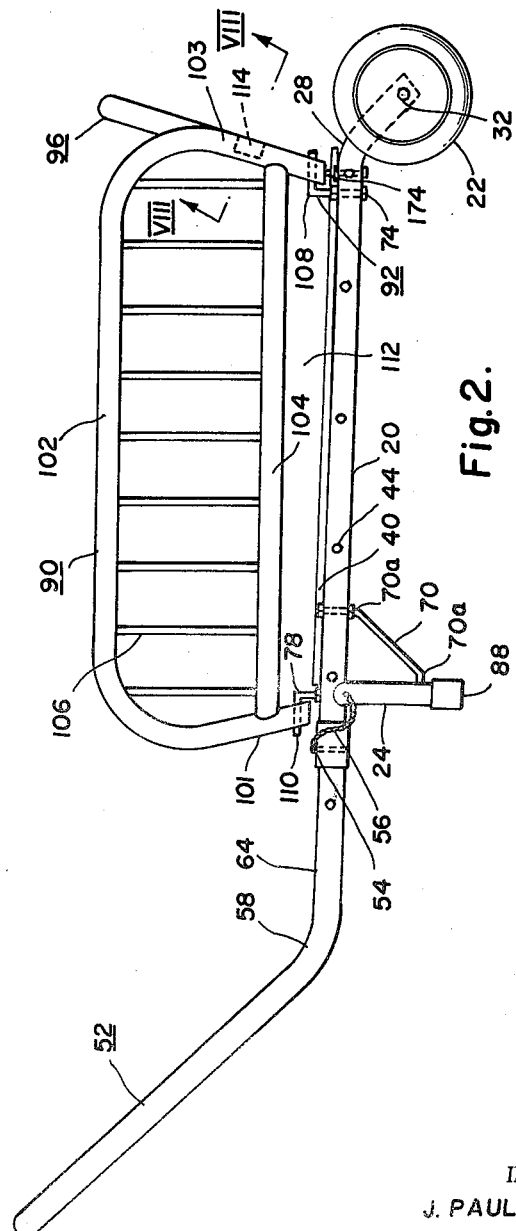
FIGURE 2 is a side elevational view of the cart depicted in FIG. 1 but showing the operative positions of the front and side walls thereof, of the collapsible cart illustrated in FIG. 1.
Figure 3:
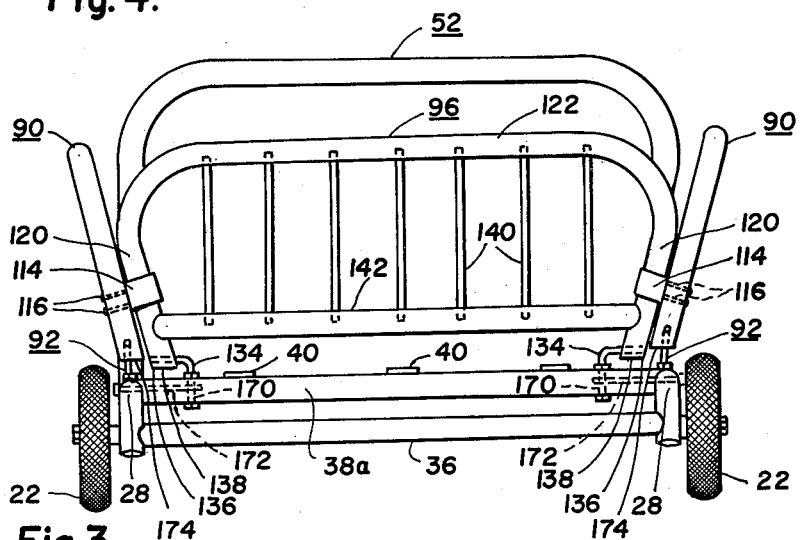
FIGURE 3 is a front elevational view of the collapsible cart depicted in FIG. 2.

Referring now more particularly to FIGS. 1 thru 3 of the drawings there is shown an illustrative form of the collapsible cart arranged according to the invention and comprising a generally horizontal platform 20 provided with a pair of wheels 22 at the front end thereof and a pair of downwardly extending supports 24 adjacent the rear end thereof. As better shown in FIGS. 1 and 2 the platform 20 is fabricated from a pair of spaced longitudinal extending tubular members or platform rails 26, each of which is bent downwardly adjacent its front end, as denoted by reference character 28, in order to reduce the required diameter of the wheels 22 while maintaining the platform 20 generally horizontal with the supports 24 resting upon the ground.

The wheels 22 are mounted upon a transversely extending axle 30 and retained thereon by collar members 32 or other suitable fasteners secured to each end of the axle 30. Similar collar members 34 also are mounted on the axle 30 at the inner surfaces of the wheels 22 and serve to space the wheels from the adjacent portions of the tubular members 26. The tubular members 26 in turn are spaced from one another by a hollow axle housing 36 thru which the axle 30 is extended. Sleeve type bearings are afforded the axle 30 at points of its passage thru the tubular members 26 by apertured plugs 37, respectively. The tubular members 26 additionally are maintained in their spaced relationship by other portions of the framework 20 presently to be described.

The load carrying portion of the framework 20 is formed from a plurality of transverse supporting members 38 on which are mounted a number of longitudinally extending slats 40. In the present arrangement of the invention the transverse supporting members 38 are tubular in configuration and are coped at their ends in order to fit complementarily at points of their engagement with the tubular side members 26. In this form of the invention five such transverse supporting members 38 are utilized although it is to be understood that a greater or lesser member of such supports can be employed depending upon the desired size and configuration of the collapsible cart and upon the size or configuration of the item intended to comprise the load. The intermediate ones of the transverse supports 38 when thus positioned are secured in engagement with the tubular members 26 for example by a threaded rod 42 extended through each of the tubular transverse supports and suitably aligned apertures in the platform members 26 at which the threaded rods 42 are secured by means of nuts 44. Other equivalent fastening means can be substituted for the rods and nuts 42 and 44 for example the eyebolts and associated fasteners described hereinafter in connection with the endmost transverse supports 38a and 38b.

Alternatively separable fasteners such as mentioned previously can be eliminated and the transverse supports 38 can be welded to the longitudinal platform rails 26.

The load carrying portion of the platform 20 is completed, in this example, by a number of slats 40 disposed in this example longitudinally of the collapsible cart and mounted upon the upper surfaces of the transverse supports 38. In this arrangement of the invention three such slats 40 are employed although obviously their number can be varied as pointed out previously in connection with the transverse supports 38. Each of the slats 40 in this arrangement is apertured at the endmost and middle ones of the transverse supports 38 for receipt in this example of self threading metal screws 46. Alternatively corresponding apertures in the endmost and middle transverse supports can be tapped for receipt of desirably flat-headed machine screws.

Suitable fabricating materials for the transverse supports and platform rails 26 is aluminum or one of its alloys while the slats 40 can be constructed of a wood of good load-bearing capacity such as oak.

At the other, rear end of each platform rail 26 the rail is expanded or otherwise provided with an enlarged end portion 48. The enlarged portions 48 serve as sleeves into which the lower end portions 50 of the U-shaped or bifurcate handle 52 are inserted. When thus fully inserted each of the end portions 50 is provided with vertically disposed apertures, as viewed in FIG. 2 of the drawings, in alignment with similar apertures in the enlarged portions 48. With the apertures thus aligned a retaining pin 54 can be inserted through each end portion 50 in order to retain the handle 52 in its operative inserted position. The retaining pins 54 desirably are loosely secured to the framework 20, for example, by short lengths of chain 56, respectively, the other ends of which are secured by suitable fastening means to the cart stationary supports 24, in this example.

The handle 52 is bent upwardly, as viewed in FIG. 2 of the drawings and as indicated by reference character 58 so that the hand-grip member or bight portion 60 of the handle can be gripped at a position adjacent the hips of the average sized operator when the cart is in motion. This enables an individual to operate the cart without assuming an awkward, stooped position. If desired, a pair of individual, tubular hand-grip members (not shown) can be inserted over the handle 52 to the bight portion 60. The hand-grip members can be fabricated from rubber, plastic, cork, or the like. The lower ends of the handle 52 desirably are stabilized by a transverse supporting member 62 extending between the horizontal portion 64, as viewed in FIGURE 2 of the drawings, of the operating handle 52. The transverse supporting member 62 desirably is shaped for engagement with and secured to the horizontal portions 64 of the handle 52 in the manner described previously in connection with the intermediate transverse platform supports 38. When removed from the cart platform 20, after first removing the retaining pins 54, the operating handle 52 desirably is not longer than the length of the platform proper of the cart in order to effect ready storage and transportation of the handle 52 with the remainder of the cart when the latter is in its collapsed condition. Moreover, when the handle 52 is in its attached operating condition, as shown in FIGS. 1 and 2, the transverse supporting member 62 thereof and the horizontal portions 64 thereof are generally in alignment with the cart platform 20 and particularly the load carrying portion defined by the transverse supports 38 so that the handle supporting member 62 in effect increases the load carrying area of the collapsible cart at least for the bulkier items.

As pointed out previously, adjacent the rear end of the platform 20 are provided a pair of generally perpendicular stationary supports 24. It is contemplated, of course, that the relative positions of the supports 24 and of the wheels 22 can be reversed, if desired. In this arrangement each support 24 is of tubular configuration and is of such length to support the platform 20 in a substantially horizontal position when the collapsible cart is in an at rest or inoperative position. The upper end of each support 24 is coped as noted by reference character 68 for complementary engagement with the under side of the associated tubular platform rail 26. The supports 24 are secured respectively to the platform rails 26 by a unique arrangement presently to be described. When thus secured, however, each support 24 is further stabilized by a pair of rod braces 70 and 72 each of which is secured adjacent the lower end of the associated support 24 as by threading into suitably tapped apertures 71 and 73 therefor. To provide maximum support for the rod braces 70 and 72 and as better shown in FIGS. 12 and 13, respectively, the tapped apertures 71 and 73 of each support 24 can extend into a relatively thick sleeve 84 inserted into the lower end of the support 24, as described more fully hereinafter. The upper ends of the supporting rods 70 and 72 are joined respectively to the associated platform rail 26 and the adjacent one of the transverse platform supports 38b. Each of the rod braces 70 and 72 are suitably bent as denoted by reference characters 70a and 72a, FIGS. 1, 12 and 13, so that their threaded end portions are suitably directed for engagement with appropriately placed apertures in the supports 24 and in the associated platform rails 26 or in the platform transverse support 38b respectively. When thus inserted the upper threaded ends of the rod braces 70 and 72 are secured in the proper position by pairs of nuts 74 and 76 respectively.

It is contemplated, of course, that other suitable means can be employed for securing the rod braces 70 and 72 in their positions as shown, for example by welding.

With particular reference now to FIG. 2 of the drawings an exemplary arrangement for securing each support 24 to the associated platform rail 20 is illustrated therein. In this arrangement of the invention, the support securing means include an L-shaped bracket 78, desirably of rod-like configuration and provided with threaded portions at its lower end and adjacent its right angular bend as denoted by reference numerals 80 and as depicted more clearly in FIGURES 11, 12 and 13 of the drawings. The position of the L-shaped bracket 78 is precisely determined relative to the upper adjacent surface of the platform rail 26 by means of a cap nut 82 engaged with the upper threaded portion 80 of the L-shaped bracket 78.

The longer leg of each bracket 78, however, extends downwardly through the associated support 24 to a point just within the lower opening of the tubular support 24. Adjacent the lower end of the bracket 78 an inwardly extending shoulder is formed within the support 24, for example by means of a relatively short tubular segment or sleeve 84 shrunk-fitted or otherwise secured within the lower end of the support 24. The lower end of the sleeve 84 thus provides a bearing surface for engagement with nut 86 threaded upon the lower threaded portion 80 of the bracket 78. This arrangement of course prevents the necessity of protruding the lower end of the bracket 78 and its securing nut 86 below the lower end of the support 24. When thus secured, the lower open end of each tubular support is capped by a shoe member 88. Suitable materials of construction for the assembly just described are aluminum or one of its alloys for the supports 24, their braces 70 and 72, and bracket 78, and a relatively tough plastic material such as polyethylene for the shoe member 88.

The support bracket 78 performs the additional function of providing one hinge or pivot point for the associated one of the foldable side wall members 90, and the other hinge or pivot point for each side wall member 90 is afforded by another L bracket 92, FIGURES 1 and 2, mounted on each platform rail 26 adjacent the front end thereof but desirably immediately to the rear of its bent portion 28. As better shown in FIGURES 2, 3, and 10 of the drawings the L brackets 92 differ from the support brackets 78 in length and also in the fact that the upper portion 94 thereof is inclined outwardly of the center line of the associated platform rail 26 such that the front end of each foldable side wall 90 clears the adjacent end of the foldable front end wall 96. The lower threaded portion 98 of each bracket 92 is inserted through a suitably placed aperture in the associated platform rail 26 and is secured thereto by means of cap nuts 100. The short legs or pivot portions 108 and 110, FIGS. 2, 9 and 11, of the brackets 78 and 92 associated with each side wall 90 are extended coaxially but in apposing directions to facilitate pivoting of the side wall member thereon but to prevent disengagement therefrom after assembling the side wall members and the associated brackets to the cart platform 20.

In this arrangement of the invention each side wall member 90, as better shown in FIG. 2, is formed from an elongated inverted generally U-shaped supporting rail 102, the lower free ends of which are apertured to accommodate respectively the pivot portions 79 and 93 of the associated brackets 78 and 92. Leg portions 101 and 103 of the rail 102 are inclined inwardly for appearance and also so that the front leg portion 103 of each side wall 90 generally is aligned with the inclination of the front wall 96 when the walls 90 and 96 are in their erect or operative positions, as better shown in FIG. 2. The leg portions of the rail 102, which in this example is tubular, are connected by a horizontal tubular brace 104, which is joined to the rail member 102 in the same manner as that described hereinafter in connection with the front wall member 96. The framework of each side wall 90 is completed by a plurality of vertical rods 106, desirably spaced evenly along the length of the rail 102 and the brace 104. For connection to the rail 102 and brace 104 each rod 106 has its ends inserted respectively into an aligned pair of apertures disposed in the rail 102 and brace 104 and is retained therein in dowel fashion after the rail 102 and brace 104 are assembled. In this case the dowel rods desirably are made of wood. Alternatively the rods 106 can be fabricated from metal such as aluminum or its alloys and secured respectively to the rail and brace for example by welding. In this arrangement of the collapsible cart nine such rods 106 are employed for each collapsible side wall 102 and for appearance can be painted a variety of colors.

As better shown in FIG. 2 of the drawings, each side wall 90 is inclined upwardly toward the front of the cart for example by increasing the elevation of pivot portion 108 of the front side wall bracket 92 relative to the pivot portion 110 of the rear side wall bracket 78 this operation also places the pivot point of the front end of the side wall brackets 102 at a position relatively higher than the pivot points of the front wall 96 presently to be described in connection with FIG. 3 of the drawings. Thus when the front wall 96 is first folded to its collapsed position as shown in FIG. 1 of the drawings it will be seen that the framework thereof lies generally below the pivot axis of each side wall member 90, as represented by reference line 112 of FIG. 2. For smooth operation of the side walls 90, when pivoted between their erect and folded positions, the pivot portions 108 and 110 of their associated brackets 92 and 78 desirably as extend coaxially along the reference line 112. With the front end wall 96 thus folded, both side walls 90 then can be collapsed to positions overlying and substantially contiguous with the upper folded side of the front wall 96 as better shown in FIG. 1 of the drawings. In furtherance of this purpose each side wall 90 desirably is equivalent in height to not more than one-half the width of the load-carrying platform 20 of the cart, so that their top surfaces will clear each other when the side walls are folded.

In the operative condition of the cart, as shown in FIGS. 2 and 3, the ends of the front end wall 96 are joined frictionally, respectively, to the front ends of the side walls 90 to afford mutual support to the walls 90 and 96. In one arrangement for so joining the walls, a C-clamp 114 is secured to the inclined front leg portion 103 of each side wall rail 102, as better shown in FIG. 8 of the drawings. The C-clamp is secured to the inward surface of each associated rail member 102 for example by means of aluminum rivets 116 extending transversely through the rail member 102. Alternatively self-threading screws or other suitable fastening means can be employed, depending upon materials employed for construction of the cart. The C-clamps 114 are aligned such that when the front wall member 96 is pivoted to its upstanding or operative position as shown in FIGS. 2 and 3 the inclined leg portions 120 of its inverted generally U-shaped rail member 122 engage respectively and simultaneously the C-clamps 114. When thus engaged each inclined leg portion 120 of the front wall member 96 is engaged frictionally by outer free end 124 of the associated C-clamp 114 and heads 126 of the rivets 116. As better shown in FIG. 9 of the drawings, two such rivets 116 desirably are employed for each C-clamp 114. In the manner noted previously in connection with the side walls 90, each leg portion 120 of the front wall rail 122 is inclined inwardly to conform generally to the outward inclination of the associated side wall 90. Thus all of the front and side walls 90 and 96 are inclined outwardly to increase the load carrying capacity of the cart and to lend a more pleasing appearance thereto design-wise.

To increase the wearability of the collapsible cart each lower end of the side wall rail members 102 is furnished with a dowel or plug 128 to provide increased bearing surface for engagement with the pivot legs 108 and 110 respectively of the side wall brackets 92 and 78. As better shown in FIGS. 9 and 11 each dowel 128 is provided with a substantially horizontally extending transverse aperture 130 disposed in alignment with apertures 132 in each end of the side wall rail 102 to accommodate the aforementioned bracket legs 108 and 110 respectively. The lower ends of the rail members 102 and of the dowels 128 desirably are beveled coplanarly to present a neat appearance of the rail ends. Desirable materials of construction for the dowels 128 are aluminum or wood.

Figure 14:
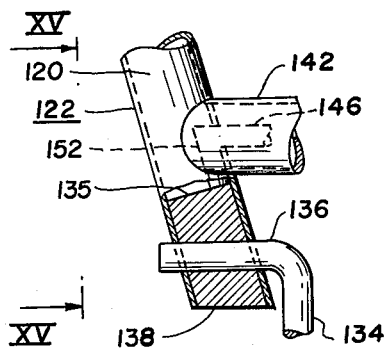
FIGURE 14 is an enlarged, partially sectioned detailed view of the left-hand bearing and bracket assembly of the front end wall of the cart.
Figure 16:
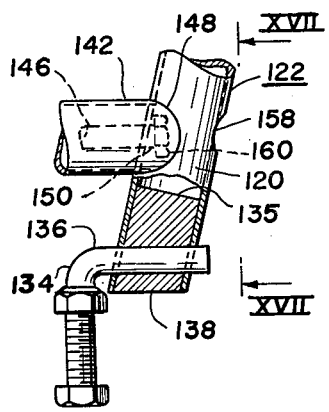
FIGURE 16 is a detailed view similar to FIG. 14 but showing the right-hand bearing and bracket assembly of the front end wall; and, FIGURE 17 is a side elevational view of FIG. 16 taken along reference line XVII—XVII thereof.
Figure 17:
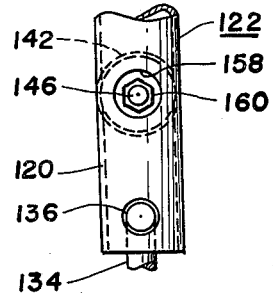

As better shown in FIGS. 3 and 9 of the drawings the front wall member 96 is pivoted relative to the cart platform 20 through the use of L-shaped brackets 134 which are secured adjacent the ends of the frontmost transverse support 38a of the cart platform 20. The brackets 134 are secured to the cart platform in the manner described previously in connection with the side wall brackets 92. As seen in FIGS. 14 and 16, plug inserts or dowels 135 are also inserted into the ends respectively of the front wall rail 122 in order to afford additional bearing surface for pivot portions 136 of the brackets 134, as described above relative to the side wall dowels 128. As pointed out previously, the pivot portions 136 of the brackets 134 are disposed at a lower elevation relative to the cart platform 20 than are the pivot portions 108 of the front side wall brackets 92. However, the pivot portions 136 are raised sufficiently above the cart platform 20 so that the lower ends 138 of the front rail 122 clear the adjacent surfaces of the cart platform 20 when the front wall member 96 is folded to its collapsed position (FIG. 1). The elevation of the pivot legs 136 is further increased so that in its folded position the front wall member 96 is supported in a plane generally parallel to the pivot axis or reference line 112, FIG. 2, of the side wall members 90 and hence to the plane of the side wall members in their folded positions. This arrangement permits the side walls 90 to lie flush upon the front wall 96, when all of the walls 90 and 96 are in the folded condition.

Figure 4:
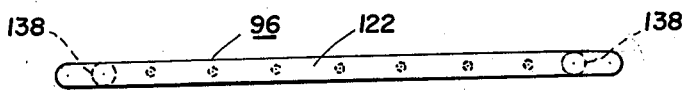
FIGURE 4 is a top plan view of the front end wall of the cart shown in FIGS. 1–3.

Referring again to FIG. 3 of the drawings, the structural framework of the front wall member is completed in the same manner as that described previously in connection with the side wall members 90, with the exception that due to the relatively shorter length of the front wall 96, in this example, a fewer number of vertical rods 140 are employed. A desirable location of the rods 140 relative to the front wall rail 122 is shown more precisely in FIG. 4 of the drawings. As better shown in FIG. 5 the rods 140 are located in a similar manner with respect to the brace member 142 of the front wall 96.

Figure 5:
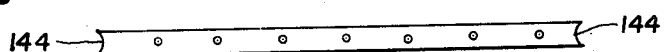
FIGURE 5 is a top plan view of the brace member of the aforesaid front end wall.
Figure 6:
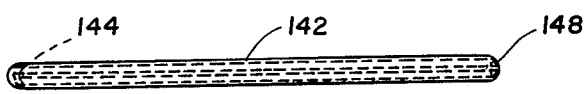
FIGURE 6 is a front elevational view of the brace member of FIG. 5 together with fastening means therefor.

As shown in FIGS. 5 and 6 the ends of the brace member 142 are both inclined and coped as denoted by reference character 144 for closely fitting, complementary engagement with the adjacent surfaces of the inclined portions 120 of the front wall rail 122.

Figure 7:
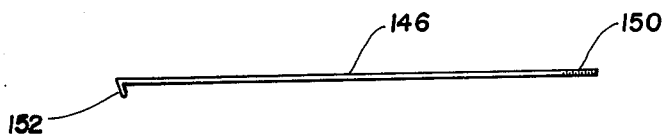
FIGURE 7 is a front elevational view of the fastening means of FIG. 6.
Figure 15:
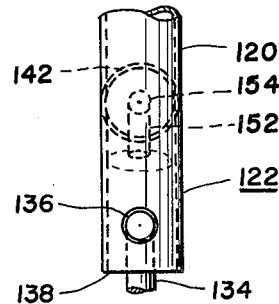
FIGURE 15 is a side elevational view of FIG. 14 taken along reference line XV—XV thereof.

The brace 142 or 104 of the cart front and side rail members are secured thereto by means of a hooked connecting rod 146 such as that shown in FIGS. 6 and 7 of the drawings. The length of the connecting rod 146 is of course determined by the associated brace 142 or 104 from the coped end 148 of which the threaded end 150 of the connecting rod 146 protrudes slightly. To assemble the brace, for example the brace 142 of the front wall member 96, a hooked end 152 of the connecting rod 146 is first fitted into an aperture 154, FIG. 15, in the left-hand inclined portion 120 of the front rail member as better shown in FIG. 14 of the drawings. This arrangement, of course, minimizes the number of separate fasteners required for the collapsible cart.

After inserting the free, threaded end 150 of the connecting rod 146 into the brace 142, the threaded end of the connecting rod is inserted through an aperture 156 in the adjacent surface of the other inclined portion 120 of the front rail 122. Before inserting the connecting rod into the aperture 156, however, the ends of the vertical or upstanding rods 140, if furnished in the form of dowels, desirably are inserted respectively into suitably disposed apertures therefor in the rail 122 and the brace 142. When thus inserted, the threaded end of the connecting rod 146 lies within and terminates intermediately of the walls of the tubular front rail 122, in this example. Furthermore, the aperture 156, and hence the rod 146, are aligned with a second, larger aperture 158 formed in an opposite wall section of the right-hand inclined rail portion 120 (FIG. 16). The aperture 158 is sized freely to receive a retaining nut 160, which is then threaded upon the threaded end 150 of the connecting rod 146. After desirably locating the brace member 142 substantially coaxially of the connecting rod 146, the nut 160 is tightened with a socket wrench, or the like, to secure the components of the wall member together.

In certain applications, the aperture 158 can be reduced to the size of the aperture 156, and the connecting rod 146 extended completely through the other inclined portion 120 of the front wall rail 122, for securance by a cap nut 149 (FIG. 11) or other suitable fastener. Although a cap nut 149 is shown in FIG. 11 for purposes of illustration the recessed nut arrangement of FIG. 16 is preferred also for securing the connecting rod 151 (FIGS. 9 and 11), when used for the side walls 90. If desired, the connecting rod 146 can be omitted, and the brace member 142 can be joined to the inclined leg portion 120, as by welding, as pointed out previously in connection with the transverse platform members or crossbraces 38.

Alternatively, either the rods 42 (FIG. 1) or the connecting rod 146 (FIG. 6) can be omitted and the eyebolt arrangement employed, as shown more particularly in FIGS. 1 and 12 in connection with the transverse platform member 38b. In the latter member, the upper ends of the rod braces 72, one of which is shown in FIG. 12, extend transversely thru the longitudinal axis of the crossbrace member 38b, with the result that it is difficult if not impossible to insert a connecting rod such as is referenced at 42 in the crossbraces 38. Instead, in this example, a vertically extending mounting bolt is inserted, thru suitable apertures therefor, adjacent each end of the crossbrace 38b and is secured by nut 164. Alternatively, the nut 164 can be omitted and the bolts 162 can be retained by frictional engagement with the crossbrace 38b when the associated eyebolts, described below, are tightened. Each bolt 162 also extends thru the eye of an eyebolt 166 which is inserted transversely thru adjacent apertures in the associated platform rail 26 and longitudinally for a short distance into the open end of the crossbrace 38b. When thus positioned, the eyebolts are secured by nuts 168 to secure the ends of the crossbrace 38b to the platform rails 26, respectively.

In a similar manner, the ends of the frontmost crossbrace 38a are secured respectively to the platform rails 26, as seen in FIGS. 1 and 3. The pivot brackets 134, described previously, likewise inhibit the use of a connecting rod, such as the rod 42 (FIG. 1) or 146 (FIGS. 6 and 7). However, the pivot brackets here perform the added function of the mounting bolts 162, described above, in that the vertical portions 170 thereof are inserted respectively thru eyebolts 172, which are otherwise positioned with reference to crossbrace 38a in the same manner as denoted above relative the eyebolts 166 of crossbrace 38b. Thus, the pivot brackets 134 and the eyebolts 172 serve to secure the ends of the crossbrace 38a to the platform rails 26, respectively.

Also, alternatively, the ends of each of the crossbraces, mentioned herein, can be flattened for wrapping about a portion of the adjacent circumference of the platform rails or handle 52, as the case may be, for securance thereto by bolts, welding, or other suitable fastening means.

In the operation of the invention, to collapse the front and side walls of the cart, the front wall 96 is moved inwardly to detach the front wall simultaneously from both C-clamps 114. The side walls 90 are then permitted to pivot outwardly to a substantially horizontal position, after which the front end wall is pivoted to its inoperative position, where it lies generally parallel the reference line 112 and upon the slats 40, as shown in FIG. 1. In this example, the sidewalls and the right and left extremities of the front wall are sized such that the front wall just clears the adjacent portions of the side walls. This determines, to a degree, the elevation of the side wall brace 104 relative to the side wall rail 102. In other words, the distance between the two side wall braces in their outward horizontal positions is at least slightly greater than the overall width of the front wall.

In furtherance of this same purpose, the front side wall brackets 92 are inclined outwardly, in this example as shown in FIG. 3, so that the front ends 174 of the side wall rails will just clear the adjacent portions of the front wall as the latter is folded with the side walls in the outward, horizontal positions.

After the front wall has been folded upon the slats 40, the sidewalls are then pivoted from their temporary outwardly extending horizontal positions to their folded or inoperative positions, which are flush upon the upper surfaces of the front wall, as viewed in FIG. 1. Desirably the height of each side wall is equal to substantially one-half the width of the platform 20 or less so that the sidewalls can be folded without overlapping. The handle 52 can be removed as described previously.

In returning the cart to its operative state the aforedescribed process is reversed, taking care that the left and right extremities of the front wall are engaged, in this example, simultaneously with the C-clamps 114.

From the foregoing it will be seen that novel and efficient forms of a foldable carrier device have been disclosed herein. It is intended, however, that the foregoing description be taken as illustrative of the broad principles of the invention and not as limitative thereof. Therefore, numerous modifications of the invention will occur to those skilled in the art to which it pertains without departing from the spirit and scope of the invention. Moreover, it is to be understood that certain features of the invention can be employed without a corresponding use of other features thereof.

Accordingly, what is claimed as new is:

1. A collapsible carrier device comprising a pair of spaced generally parallel rail members, a load-carrying platform extending between and secured to said rail members, said platform including a plurality of spaced transversely extending tubular brace members secured at their ends to said rail members respectively, a wheel-supported axle secured to said rail members adjacent the front ends thereof, a foldable side wall member hingedly secured to each of said rail members, a foldable front wall member hingedly secured to the frontmost one of said brace members, means for detachably securing said front wall member to the adjacent ends of said side-wall members to support said wall members in the upright positions thereof, each of said front and said side-wall members including an inverted generally U-shaped supporting rail provided with aligned pivot openings adjacent each end thereof respectively, a pair of angular pivot brackets for each of said wall members secured to the associated rail member and to said front-most brace member respectively, the pivot arms of said brackets extending thru said apertures respectively and disposed generally in alignment with said rail members and said front-most brace member respectively, said front-most brace member being secured to said rail members by a pair of eyebolts secured to said rail members respectively with their eye-ends inserted into the open ends respectively of said front-most brace member, the securance of said front-most brace member being completed by extending portions of said front-wall brackets thru said eye-ends, respectively, and handle means secured to rail members for operating said carrier device.

2. A collapsible carrier device comprising an elongated platform, a wheel-supported axle mounted adjacent one end of said platform, a pair of foldable side-wall members hingedly secured to said platform at positions adjacent the lateral edges thereof respectively, a foldable end-wall member hingedly secured to said platform adjacent an end thereof, each of said wall members including an inverted generally U-shaped tubular rail having its end portions hinged to said platform, the ends of said end-wall rail being hinged at positions adjacent hinged end portions respectively of said side-walls, at least one of said U-shaped rails having a tubular crossbrace member engaging the legs thereof at positions adjacent their free ends, each of said legs having an aperture in its inward wall surface and aligned with said crossbrace, a connecting rod inserted through said crossbrace and having a hooked end and fastening means at the other end thereof, said hooked end being inserted into one of said apertures, said fastening means end extending through the other of said apertures but terminating short of the outward wall of the associated leg, said outward wall having a relatively larger aperture formed therein and juxtaposed to said other aperture, cooperating fastening means inserted through said larger aperture and engaged with said fastening means end for securing said crossbrace to said one U-shaped rail, means detachably joining said end-wall rail end portions to the corresponding end portions of said side-walls for supporting said wall members in operative upright positions to increase the load-carrying capability of said carrier device, and handle means detachably secured to said platform for operating said carrier device.

3. A foldable wall member for a collapsible carrier device and the like, said wall member comprising an inverted generally U-shaped tubular rail, a tubular crossbrace member engaging the legs of said rail at positions adjacent their free ends, each of said legs having an aperture in its inward wall surface and aligned with said crossbrace, a connecting rod inserted through said crossbrace and having a hooked end and fastening means at the other end thereof, said hooked end being inserted into one of said apertures, said fastening means end extending through the other of said apertures but terminating short of the outward wall of the associated leg, said outward wall having a relatively larger aperture formed therein and juxtaposed to said other aperture, cooperating fastening means inserted through said larger aperture and engaged with said fastening means end for securing said crossbrace to said one U-shaped rail, and means for hingedly joining said legs to a load carrying platform of said carrier devices.

4. A collapsible carrier device comprising a load-carrying platform including a pair of spaced generally parallel rail members and a plurality of spaced tubular crossbrace members secured at their ends to said rail members respectively, at least one of said crossbrace members being secured by a pair of eyebolts having their shank ends secured to said rail members respectively and their eye ends inserted into the ends respectively of said one crossbrace member, a mounting bracket extending transversely through said one crossbrace member adjacent each end thereof, said mounting brackets being inserted respectively through the openings of said eye-bolts to secure said one crossbrace member to said rail members, a wheel supported axle mounted on said rail members, foldable wall means hingedly joined to said mounting brackets, and handle means detachably secured to said platform for operating said carrier device.

5. A collapsible carrier device comprising a pair of spaced generally parallel rail members, a load carrying platform extending between and secured to said rail members, a wheel supported axle secured to said rail members adjacent the front ends thereof, a foldable side-wall member hingedly secured to each of said rail members, a foldable front-wall member hingedly secured to said platform at a position adjacent the front end thereof, means for detachably securing said front-wall member to said side-wall member ends to support said wall members in the upright operative positions thereof, each of said front and said side wall members including an inverted generally U-shaped supporting rail provided with aligned pivot openings adjacent the ends thereof respectively, a pair of angular pivot brackets for each of said side-wall members, said side-wall brackets each having a base portion secured to the associated rail member, a pair of angular pivot brackets for said front-wall, said front-wall brackets each having a base portion secured to said platform, each of said brackets having a pivot arm disposed at an angle to its base portion, said pivot arms of said brackets extending thru said pivot openings respectively and disposed generally in alignment with said rail members and said platform respectively, said brackets each being of L-shaped configuration and the pivot arms of each pair of brackets being opposed to prevent removal of the associated wall member, a supporting leg for each of said rail members mounted at the rear pivot bracket of the associated side-wall member, and said rear pivot brackets of said side-wall members extending through their associated rail members and being joined respectively to said supporting legs so that said last-mentioned brackets in addition secure said supporting legs to said rail members respectively, and handle means secured to said rail members for operating said carrier device.

6. A collapsible carrier device comprising a pair of spaced generally parallel rail members, a load carrying platform extending between and secured to said rail members, a wheel supported axle secured to said rail members adjacent the front ends thereof, a foldable side-wall member hingedly secured to each of said rail members, a foldable front-wall member hingedly secured to said platform at a position adjacent the front end thereof, means for detachably securing said front-wall member to said side-wall member ends to support said wall members in the upright operative positions thereof, each of said front and said side-wall members including an inverted generally U-shaped supporting rail provided with aligned pivot openings adjacent the ends thereof respectively, a pair of angular pivot brackets for each of said side-wall members, said side-wall brackets each having a base portion secured to the associated rail member, a pair of angular pivot brackets for said front-wall, said front-wall brackets each having a base portion secured to said platform, each of said brackets having a pivot arm disposed at an angle to its base portion, said pivot arms of said brackets extending thru said pivot openings respectively and disposed generally in alignment with said rail members and said platform respectively, a supporting leg for each of said rail members mounted at the rear pivot bracket of the associated sidewall member, and said rear pivot brackets of said sidewall members extending through their associated rail members and being joined respectively to said supporting legs so that said last-mentioned brackets in addition secure said supporting legs to said rail members respectively, and handle means secured to said rail members for operating said carrier device.

7. A collapsible carrier device comprising a load-carrying platform including a pair of spaced generally parallel rail members and a plurality of spaced tubular crossbrace members secured at their ends to said rail members respectively, at least one of said crossbrace members being secured by a pair of eyebolts having their shank ends secured to said rail members respectively and their eye ends inserted into the ends respectively of said one crossbrace member, a mounting bracket extending transversely through said one crossbrace member adjacent each end thereof, said mounting brackets being inserted respectively through the openings of said eye-bolts to secure said one crossbrace member to said rail members, a wheel supported axle mounted on said rail members, foldable end wall means hingedly joined to said mounting brackets, a supporting leg mounted on each of said rail members, an additional pair of mounting brackets spacedly secured to each rail member, a similarly disposed one of each said additional pairs of brackets extending transversely thru its associated rail member and joined to the associated supporting leg to secure the latter to its rail member, foldable side wall means hingedly joined respectively to said additional pairs of brackets and handle means detachably secured to said platform for operating said carrier device.

8. A collapsible carrier device comprising a load-carrying platform including a pair of spaced generally parallel rail members and a plurality of spaced tubular crossbrace members secured at their ends to said rail members respectively, at least one of said crossbrace members being secured by a pair of eyebolts having their shank ends secured to said rail members respectively and their eye ends inserted into the ends respectively of said one crossbrace member, a mounting bracket extending transversely through said one crossbrace member adjacent each end thereof, said mounting brackets being inserted respectively through the openings of said eye-bolts to secure said one crossbrace member to said rail members, a wheel supported axle mounted on said rail members, foldable end wall means hingedly joined to said mounting brackets, a supporting leg mounted on each of said rail members, an additional pair of mounting brackets spacedly secured to each rail member, a similarly disposed one of each said additional pairs of brackets extending transversely through its associated rail member and joined to the associated supporting leg to secure the latter to its rail member, foldable side wall means hingedly joined respectively to said additional pairs of brackets, each of said brackets and said additional brackets being of angular configuration and the hinged portions of each pair thereof being opposed to prevent removal of the associated wall means, and handle means detachably secured to said platform for operating said carrier device.

References Cited by the Examiner

UNITED STATES PATENTS

| | | | |
|---|---|---|---|
| 357,566 | 2/87 | Banks | 280—36 |
| 1,024,469 | 4/12 | Ballinger | 280—47.37 |
| 2,727,751 | 12/55 | Souris | 280—41 |
| 2,782,047 | 2/57 | Moran | 280—36 |
| 2,815,220 | 12/57 | Shaeffer et al. | 280—47.3 |

FOREIGN PATENTS

| | | |
|---|---|---|
| 41,489 | 1/30 | Denmark. |
| 870,380 | 12/41 | France. |
| 956,468 | 8/49 | France. |

A. HARRY LEVY, *Primary Examiner.*

PHILIP ARNOLD, *Examiner.*